(12) United States Patent
Teng et al.

(10) Patent No.: US 9,224,208 B2
(45) Date of Patent: Dec. 29, 2015

(54) IMAGE-BASED SURFACE TRACKING

(75) Inventors: Hongbo Teng, Fremont, CA (US);
Gregory C. Best, San Francisco, CA (US); Sy Bor Wang, Palo Alto, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 483 days.

(21) Appl. No.: 13/382,913

(22) PCT Filed: Jul. 6, 2010

(86) PCT No.: PCT/US2010/041096
§ 371 (c)(1),
(2), (4) Date: Apr. 7, 2012

(87) PCT Pub. No.: WO2011/005783
PCT Pub. Date: Jan. 13, 2011

(65) Prior Publication Data
US 2012/0195466 A1     Aug. 2, 2012

(51) Int. Cl.
*G06K 9/00*     (2006.01)
*G06T 7/20*     (2006.01)
*G06T 7/00*     (2006.01)

(52) U.S. Cl.
CPC ............ *G06T 7/20* (2013.01); *G06T 7/0075* (2013.01); *G06T 2207/10021* (2013.01); *G06T 2207/10028* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,285,712 B1 * | 9/2001 | Kondo et al. | 375/240.16 |
| 2002/0164067 A1 * | 11/2002 | Askey et al. | 382/154 |
| 2004/0152970 A1 * | 8/2004 | Hunter et al. | 600/424 |
| 2004/0152972 A1 * | 8/2004 | Hunter | 600/424 |
| 2005/0054910 A1 * | 3/2005 | Tremblay et al. | 600/411 |
| 2005/0190972 A1 * | 9/2005 | Thomas et al. | 382/218 |
| 2006/0084867 A1 * | 4/2006 | Tremblay et al. | 600/434 |
| 2008/0101713 A1 * | 5/2008 | Edgar | 382/260 |

* cited by examiner

*Primary Examiner* — Hadi Akhavannik
(74) *Attorney, Agent, or Firm* — Kilpatrick Townsend & Stockton LLP

(57) ABSTRACT

A method of image-tracking by using an image capturing device (12). The method comprises: performing an image-capture of a scene (54) by using an image capturing device; and tracking movement (62) of the image capturing device (12) by analyzing a set of images by using an image processing algorithm (64).

14 Claims, 4 Drawing Sheets

IMAGE-BASED SURFACE TRACKING

CROSS-REFERENCE TO RELATED APPLICATIONS

This application is a U.S. National Stage of International Application No. PCT/US2010/041096, filed Jul. 6, 2010, which claims priority to U.S. patent application Ser. No. 12/459,843, filed Jul. 7, 2009, now U.S. Pat. No. 8,229,166.

TECHNICAL FIELD

The technology relates to the field of image-based navigation.

BACKGROUND

In areas without a clear view of the sky, e.g. tunnels or forests, GPS devices face the challenging task of maintaining accurate localization, due to the lack of reception from the GPS satellites. We present an application, which we call "ground tracking", that can recover the 3D location of an image capturing device. This image capturing device, which can be in any orientation, captures images and uses a combination of statistics and image processing algorithms to estimate its 3D trajectory.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of image-tracking is provided. The method comprises: (A) performing an image-capture of a scene by using an image capturing device; and
(B) tracking movement of the image capturing device by analyzing a set of images.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
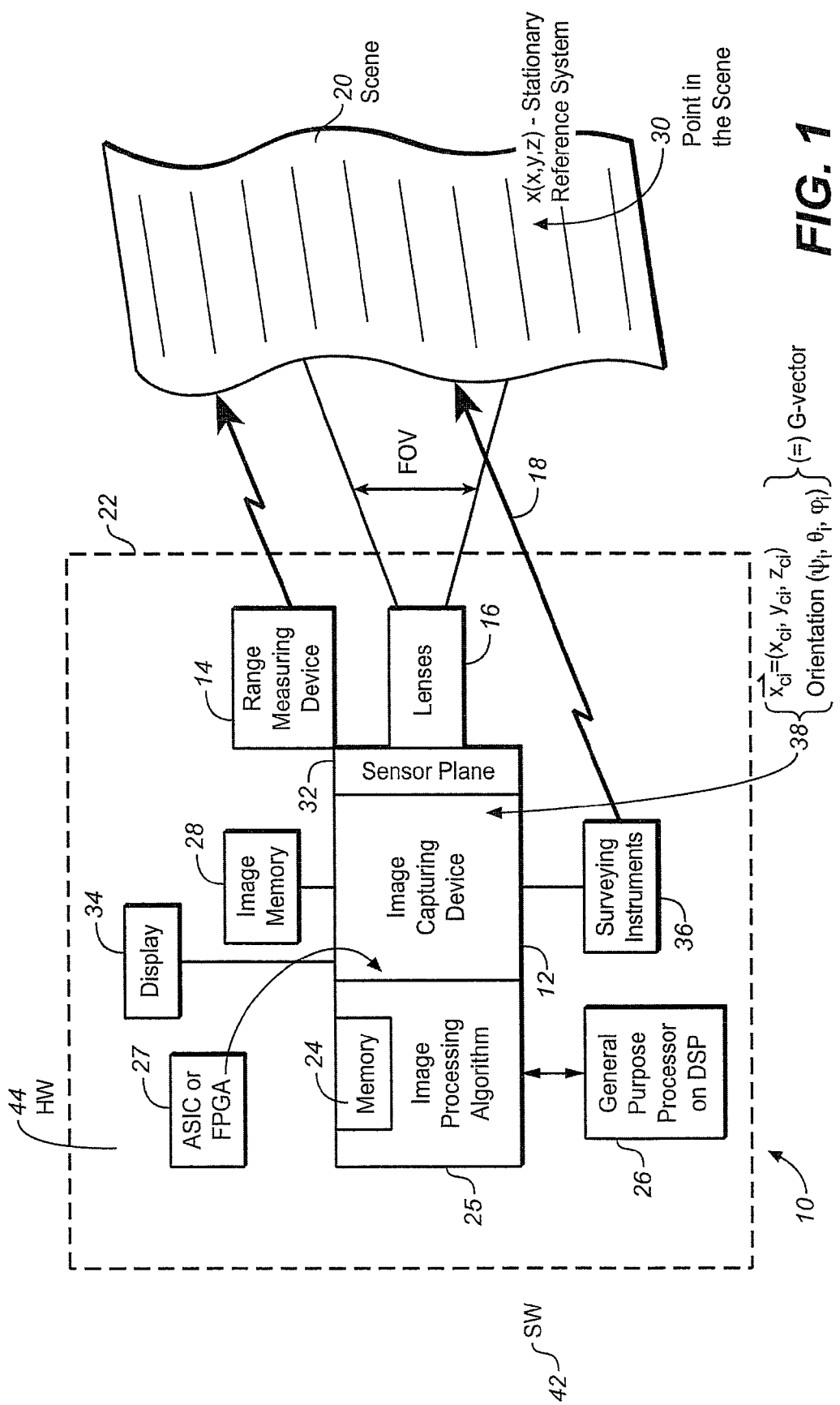
FIG. 1 depicts an apparatus for image-tracking in accordance with an embodiment of the present technology.

FIG. 1 is a block diagram 10 that illustrates an apparatus for image-tracking 22 in accordance with an embodiment of the present technology.

In an embodiment of the present technology, the image-tracking apparatus 22 further comprises: an image capturing device 12 configured to perform an image-capture of a scene 20 in a software mode (SW) further comprising a memory 24 loaded with an image processing algorithm 25, and a general purpose processor (or a Digital Signal Processor, or a Graphic Processing Unit, etc) 26 configured to analyze the set of images by enabling the image processing algorithm 25.

In an embodiment of the present technology, the image-tracking apparatus 22 further comprises: an image capturing device 12 configured to perform an image-capture of a scene 20 in a hardware mode (HW) further comprising an ASIC chip (or FPGA chip) 27 (in analog or digital modes) configured to analyze the set of images by implementing in hardware the image processing algorithm 25.

The image capturing device 12 is selected from the group consisting of: {a digital camera; a digital video camera; a digital camcorder; a stereo digital camera; a stereo video camera; a motion picture camera; a television camera; and a depth camera}.

In an embodiment of the present technology, the image capturing device 12 is a light-tight box in which an image of a scene 20 is formed by a pinhole or lenses 16 at a sensor plate 32. Still video and digital cameras store the images in a solid-state memory 28, or on magnetic media or optical disks 28.

Motion picture or cine cameras record movement at regular intervals in a series of frames. Television and video cameras record movement electronically for broadcast and storage on magnetic media or optical disks. Camcorders are video cameras which contain both the image sensor and recording media in a single unit.

Except for pinhole cameras, which focus the image on the film through a tiny hole, all other cameras use lenses 16 for focusing. The focal length of lenses, i.e., the distance between the rears of the lenses (when focused on infinity) the imaging device, determines the angle of view, or field of view (FOV) 18 and the size of objects as they appear on the imaging surface-sensor plate 32. The image is focused on that surface by adjusting the distance between the lenses and the surface.

In an embodiment of the present technology, the lens 16 further comprises regular rectilinear lens. Rectilinear lens is a lens in which straight lines are not substantially curved or distorted.

In an embodiment of the present technology, the lens 16 further comprises a fisheye lens. A fisheye lens is a wide-angle lens that takes in an extremely wide, hemispherical image. Fisheye lenses are often used to shoot broad landscapes. Fisheye lenses achieve extremely wide angles of view by forgoing a rectilinear image, opting instead for a special mapping (for example: equisolid angle), which gives images a characteristic convex appearance.

In an embodiment of the present technology, the lens 16 further comprises custom-calibrated lenses.

In an embodiment of the present technology, the image capturing device 12 further comprises a display 34 further comprising an optical display, a liquid crystal display (LCD), or a screen.

In an embodiment of the present technology, the image capturing device 12 further comprises a stereo digital camera. A stereo camera is a type of camera with two or more lenses. This allows the camera to simulate binocular vision, and therefore gives it the ability to capture three-dimensional images, a process known as stereo photography. Stereo cameras may be used for making stereo views and 3D pictures for movies, or for range imaging. 3-D Images Ltd., located in UK, produces a 3-D Digital Stereo camera—a fully automatic, time synchronized, digital stereo camera. Point Grey Research Inc., located in Canada produces binoculars or multiple array cameras that can provide full field of view 3 D measurements ion an unstructured environment.

The fundamental element of an image of an object is the pixel which describes a single point of color or a grayscale.

Each pixel contains a series of numbers which describe its color or intensity. The precision to which a pixel can specify color is called its bit or color depth. The more pixels an image contains, the more detail it has the ability to describe.

Since a pixel is just a logical unit of information, it is useless for describing real-world dimensions unless you also specify their size. The term pixels per inch (PPI) was introduced to relate this theoretical pixel unit to real-world visual resolution.

"Pixels per inch" (PPI) is a very straightforward term. It describes just that: how many pixels an image contains per inch of distance in the horizontal and vertical directions.

A "megapixel" is simply a unit of a million pixels. A digital camera may use a sensor array of megapixels (millions of tiny pixels) in order to produce an image. When the camera's shutter button is pressed and the exposure begins, each of these pixels has a "photo site" which stores photons. Once the exposure finishes, the camera tries to assess how many photons fell into each. The relative quantity of photons in each cavity are then sorted into various intensity levels, whose precision is determined by bit depth (0-255 for an 8-bit image).

Each cavity is unable to distinguish how much of each color has fallen in, so the above description would only be able to create grayscale images. One method used to extend digital sensors to capture color information is to filter light entering each cavity allowing the sensor to distinguish between Red (R), Green (G) and Blue (B) lights.

In an embodiment of the present technology, the distance from an object point 30 on the scene 20 depth to the image-based tracking device 22 is determined by using a range measuring device 14 selected from the group consisting of: {a point laser beam; a sonar; a radar; a laser scanner; and a depth camera}.

A point laser beam range measuring device 14 can be implemented by using a blue solid-state lasers, red diode lasers, IR lasers which maybe continuously illuminated lasers, or pulsed lasers, or sequenced lasers.

A laser scanner range measuring device 14 can be implemented by using positioning sensors offered by Sensor Intelligence website www.sick.com.

For instance, the Laser Scanner Model Name S10B-9011DA having compact housing and robust IP 65 design may be used. This laser scanner has the following data sheet: dimensions: (W×H×D)=102×152×105 mm, the scan angle of 270°, and the switching field range of 10 meters. It has the following functionality: a stand-by mode, a 7-segment input display, an integrated parameter memory in-system, a plug CANopen interface, and low energy consumption.

A sonar range measuring device 14 can be implemented by using active sonar including sound transmitter and a receiver.

Active sonar creates a pulse of sound, often called a "ping", and then listens for reflections (echo) of the pulse. This pulse of sound is generally created electronically using a sonar projector consisting of a signal generator, power amplifier and electro-acoustic transducer/array, possibly with a beam former. To measure the distance to the scene 20, the time from transmission of a pulse to reception is measured and converted into a range by knowing the speed of sound. The pulse may be at constant frequency or a chirp of changing frequency (to allow pulse compression on reception). Pulse compression can be achieved by using digital correlation techniques.

A radar range measuring device 14 can be implemented by using a transmitter that emits either microwaves or radio waves that are reflected by the scene 20 and detected by a receiver, typically in the same location as the transmitter.

In an embodiment of the present technology, the image capturing device 12 further comprises a depth camera that combines taking images of an object with measuring a distance to the object.

A depth camera can be implemented by using a ZCam video camera that can capture video with depth information. This camera has sensors that are able to measure the depth for each of the captured pixels using a principle called Time-Of-Flight. It gets 3D information by emitting pulses of infra-red light to all objects in the scene and sensing the reflected light from the surface of each object. Depth is measured by computing the time-of-flight of a ray of light as it leaves the source and is reflected by the objects in the scene 20. The round trip time is converted to digital code independently for each pixel using a CMOS time-to-digital converter. According to manufacturer 3DV Systems, the depth resolution is quite good: it can detect 3D motion and volume down to 0.4 inches, capturing at the same time full color, 1.3 megapixel video at 60 frames per second.

In an embodiment of the present technology, referring still to FIG. 1, the image capturing device 12 further comprises a surveying instrument 36 selected from the group consisting of: {a Global Navigation Satellite System (GNSS) surveying system; a laser plane system; and a theodolite}. In this embodiment, the scene 20 is pre surveyed and the scene distance data is used by the image-based tracking device 22 in combination with the set of images to determine the position coordinates of the image-based tracking device 22.

A Global Navigation Satellite System (GNSS) surveying system 36 can be implemented by using a TRIMBLE R8 GNSS system that supports all GPS and GLONASS L1/L2 signals, including the new L2C and coining L5 signals of GPS and has the capacity to track up to 44 satellites.

A Global Navigation Satellite System (GNSS) surveying system 36 can be also implemented by using The Trimble® R7 GNSS System including a high-accuracy GPS receiver and UHF radio combined in one unit. Trimble R7 GNSS can be used for RTK or static surveying. The modular Trimble R7 GNSS System employs a separate antenna: the Trimble Zephyr™ 2 when used as a rover and the Zephyr Geodetic™ 2 when used as a base station. The Trimble GeoExplorer software can be used for different pathfinder scenarios. The Trimble GeoExplorer has the following data sheet: 1 to 3 meter GPS with integrated SBAS; a High-resolution VGA display for crisp and clear map viewing; a Bluetooth and wireless LAN connectivity options; a 1 GB onboard storage plus SD slot for removable cards. It includes Windows Mobile version 6 operating system. It is also implemented as a rugged handheld with all-day battery.

A laser plane surveying system 36 can be also implemented by using a Trimble product-Spectra Precision laser GL 412 and GL 422. The Spectra Precision® Laser GL 412 and GL 422 Grade Lasers are cost-effective, automatic self-leveling lasers that do three jobs—level, grade and vertical alignment with plumb. Both lasers feature a 2-way, full-function remote control so one can make grade changes from anywhere on the jobsite for reduced setup time and faster operation. The GL 412 (single grade) and GL 422 (dual grade) lasers send a continuous, self-leveled 360-degree laser reference over entire work area, and have a wide grade range so they can be used in a variety of slope applications.

A laser plane surveying system 36 can be also implemented by using Apache Horizon laser that emits a continuous self-leveled laser beam that is rotated to create a plane of laser light. This plane extends over a work area up to 1600 foot (500 meter) diameter. The reference plane is sensed by one or more laser detectors that indicate the direction to on-grade.

A theodolite surveying system 36 can be also implemented by using Trimble® S6 DR (direct reflex) Total Station that is cable-free robotic total station and rover. One can choose from active or passive tracking with the Trimble MultiTrack Target. Active tracking allows one to locate and lock on to the correct target.

In an embodiment of the present technology, the method of image-tracking is implemented by using the image-based tracking device 22 of FIG. 1. More specifically, the step (A) is performed by using the image capturing device 12 to perform image-capture of a scene 20, whereas the step (B) of tracking movement of the image capturing device 12 is performed by analyzing a set of images using an image processing algorithm 25.

In an embodiment of the present technology, the step (A) of performing image-capture of the scene 20 is performed in real time by using the image capturing device 12.

In another embodiment of the present technology, the step (A) of performing image-capture of the scene 20 is pre-recorded by using the image capturing device 12.

In an embodiment of the present technology, the step (A) of performing image-capture of the scene 20 further comprises the step (A3) of obtaining a set of depth data of the scene 20 by pre-surveying the scene 20 using the surveying instrument 36 as was fully disclosed above.

In an embodiment of the present technology, the step (B) of tracking movement of the image capturing device 12 is performed by using the image processing algorithm 25.

In an embodiment of the present technology, the image processing algorithm 25 allows implementation of video tracking of the image capturing device 12 by analyzing the set of images it captures.

In an embodiment of the present technology, the image processing algorithm 25 assumes global rigid motion. By parameterizing the global optical flow with the image capturing device's 12 six degrees of freedom, an optimal global transformation between two consecutive frames can be found by solving a non-linear Least-Squares problem.

To perform a rigid global transformation with six degrees of freedom, one need to know the depth of the scene 20. As was fully disclosed above, either the scene 20 is pre-surveyed, or the depth measurements are obtained in real time along with the image-capture from external devices such as point laser beams, depth image capturing devices, a stereo camera rig, etc. . . .

In an embodiment of the present technology, the image processing algorithm 25 matches the optical properties of the pixels by using a frame function.

In an embodiment of the present technology, with the depth information available, the image processing algorithm 25 matches the depth of the two frames (instead of optical properties of the pixels) by redefinition of frame function.

In an embodiment of the present technology, the image processing algorithm 25 can be improved by matching a combination of pixel optical properties and depth information. This can be done by either using a combined cost function, or aiding one process with the other, as fully disclosed below.

In an embodiment of the present technology, the image processing algorithm 25 utilizes several coordinate systems: a stationary reference system; a reference system attached to the image capturing device 12; and a 2D reference system on image capturing device's sensor plane 32.

In the stationary reference system a point 30 in the scene 20 has coordinates x=(x,y,z), the image capturing device 12 is described by 6-vector 38 comprising device's position coordinates $x_{ci}=(x_{ci}, y_{ci}, z_{ci})$ and device's orientation coordinates $(\psi_i, \theta_i, \varphi_i)$ (yaw, pitch and roll) for each $i^{th}$ frame.

In the reference system attached to the image capturing device 12 the same point 30 in the scene 20 has coordinates $x_i=(x_i, y_i, z_i)$ w.r.t. the image capturing device 12.

In the 2D reference system attached to the image capturing device's sensor plane 32 the 2D pixel coordinates of a point in the $i^{th}$ frame is: $u_i=(u_i, v_i)$.

The relation between the stationary 3D system and the image capturing device-attached 3D system is as follows:

$$x_i = (x - x_{ci})R_i, \quad \text{(Eq. 1)}$$

Where $$R_i = \begin{pmatrix} \cos(\psi_i) & -\sin(\psi_i) & 0 \\ \sin(\psi_i) & \cos(\psi_i) & 0 \\ 0 & 0 & 1 \end{pmatrix} \quad \text{(Eq. 2)}$$

$$\begin{pmatrix} \cos(\theta_i) & 0 & \sin(\theta_i) \\ 0 & 1 & 0 \\ -\sin(\theta_i) & 0 & \cos(\theta_i) \end{pmatrix} \begin{pmatrix} 1 & 0 & 0 \\ 0 & \cos(\varphi_i) & -\sin(\varphi_i) \\ 0 & \sin(\varphi_i) & \cos(\varphi_i) \end{pmatrix}$$

is the rotation matrix between two systems.

The relation between the image capturing device-attached 3D coordinates and the 2D pixel coordinates depends on the mapping function m of the image capturing device 12. The mapping function takes 3D coordinates $x_i$ in the image capturing device-attached system of the $i^{th}$ frame and maps into a 2D pixel coordinates in the $i^{th}$ frame:

$$u_i = m(x_i). \quad \text{(Eq. 3)}$$

The form of the mapping function depends on the type of the lenses. In an embodiment of the present technology, wherein the lenses 16 comprise regular rectilinear lenses (in an inverted pin-hole model), the mapping function m can be derived from the following equations:

$$u_i = \frac{f}{S_u} \frac{x_i}{z_i} - u_0 \quad \text{(Eqs. 4)}$$
$$v_i = \frac{f}{S_v} \frac{y_i}{z_i} - v_0;$$

where f is the image capturing device 12 focal length, $S_u$, $S_v$ are the pixel width and height. $u_0$, $v_0$ are the offsets between the optical center and sensor center.

In another embodiment of the present technology, wherein the lenses 16 comprise orthographic fisheye lenses, the mapping function m can be derived from the following equations:

$$u_i = \frac{f}{S_u} \frac{x_i}{r} - u_0 \quad \text{(Eqs. 5)}$$
$$v_i = \frac{f}{S_v} \frac{y_i}{r} - v_0;$$

where r is the distance between the point and the optical center $$r = \sqrt{x_i^2 + y_i^2 + z_i^2}.$$

In an embodiment of the present technology, the mapping function in can be calibrated and stored in a numeric form.

To find out the reverse of the mapping function:

$$x_i = m^{-1}(u_i), \quad \text{(Eq. 6)}$$

one needs to know the depth of the object point 30.

In an embodiment of the present technology, as was disclosed above, the scene 20 is pre-surveyed. In this embodiment of the present technology, the depth measurements are made in the 3D stationary reference system $z=z(x,y)$, and do not change from frame to frame.

In an embodiment of the present technology, if a range measuring device 14 is attached to the image capturing device 12, the depth of a scene object point 30 is obtained as a function of pixel location in each frame $z_i = z_i(u_i)$. These measurements are made in the image capturing device-attached 3D reference system.

In an embodiment of the present technology, the range measuring device 14 is implemented by using a number of point lasers. In this embodiment of the present technology, since the number of point lasers are usually far less than the number of pixels, the density of depth measurements for each i-th frame is likely to be much less than the pixels density. The depth for each pixel can be obtained by interpolation among these measurements.

In an embodiment of the present technology, the range measuring device 14 is implemented by using a depth camera such as the Zcam from 3DVsystems. In this embodiment of the present technology, a grid of depth measurements is available with comparable resolution to that of the video frame, so that this grid of depth measurements can be used directly without further treatment.

In an embodiment of the present technology, the range measuring device 14 is implemented by using a stereo camera. A stereo camera allows the extraction of depth info from a number of identified feature points and the rest of the pixels can be done by interpolation.

The relation between two sequential frames $f_i$ and $f_j$ is built upon the assumption that the same point 30 in the scene 20 produces two pixels of the same intensity in two frames. That is, if $u_i$ and $u_j$ are pixel locations in $f_i$ and $f_j$ of the same object point, then $f_i(u_i) = f_j(u_j)$. Here $f_i(u_i)$ refers to the pixel intensity at $u_i$ in frame $f_i$. Under this assumption the relation between two frames is purely a geometrical transformation resulting from the image capturing device's motion.

The image capturing device motion from $f_i$ to $f_j$ can be represented by $\delta x_{ci \to j}$ and $\delta R_{i \to j}$, which is the relative shift and rotation between frames, or, $\xi_{i \to j} = (\delta x_{ci \to j}, \delta y_{ci \to j}, \delta z_{ci \to j}, \delta \psi_{i \to j}, \delta \theta_{i \to j}, \delta \phi_{i \to j})$, which is a 6-vector having the six degrees of freedom. If the image capturing device position and attitude at frame $f_i$ is known, then solving this relative motion from $f_i$ to $f_j$ gives us the position and attitude at frame $f_j$. In the following we will drop the subscript i->j whenever possible.

The same object point 30 which has coordinates $x_i$ in frame $f_i$'s reference system has coordinates $x_j$ in frame $f_j$'s reference system, and:

$$x_j = (x_i - \delta x_c) \delta R. \quad \text{(Eq. 7)}$$

Therefore in the 2D pixel coordinate systems, the relation between $u_i$ and $u_j$ is as follows:

$$u_i \xrightarrow{m^{-1}} x_i \xrightarrow{\xi} x_j \xrightarrow{m} u_j, \quad \text{(Eq. 8)}$$

where m is the mapping function. Or simply $$u_j = \delta P(u_i), \quad \text{(Eq. 9)}$$

where $\delta P = m \circ \xi \circ m^{-1}$ represents the combination of three operations.

The task now is to find out the optimal $\xi$ so that the cost function $$\int |f_i(u) - f_j(\delta P(u))|^2 du \quad \text{(Eq. 10)}$$

is minimized. This is a well-researched nonlinear least-squares problem. Solving it usually involves linear approximation and iteration. Different linear approximations give rise to different convergence methods, such as Gauss-Newton, steepest-descent, Levenberg-Marquardt descent, etc.

In an embodiment of the present technology, the image processing algorithm 25 is implemented by using Gauss-Newton formulation. To get Gauss-Newton formulation, one may expand $$f_j(\delta P(u)) \approx f_j(u) + d\xi \nabla f_j \frac{\partial \delta P(u)}{\partial \xi} \quad \text{(Eq. 11)}$$

$\nabla f_j$ is the gradient image of frame $$f_j, \frac{\partial \delta P(u)}{\partial \xi}$$

is the Jacobian of the geometrical transformation. Write $$D = \nabla f_j \frac{\partial \delta P(u)}{\partial \xi} \quad \text{(Eq. 12)}$$

as a 6×1 column vector, then one has $$d\xi \approx \int (f_i(u)-f_j(u)) D^T du / \int D D^T du \quad \text{(Eq. 13)}$$

Since $f_j$ is not a linear function of $\xi$, the (Eq. 13) is being solved by using the following iteration loop routine:
1. Initialize $\xi$;
2. Calculate $\delta P$ from $\xi$, perform transformation on $f_j$:

$$f_j(u) \Rightarrow f'_j(u) = f_j(\delta P(u));$$

3. Calculate $d\xi$ from $f_i$, $f'_j$, $$d\xi = \int (f_i(u) - f'_j(u)) D^T du / \int D D^T du;$$

4. Update $\xi$, $d\xi \Rightarrow \xi$;
5. If $d\xi$ is small enough or maximum iteration reached then exit, otherwise loop back to step 2.

In the above routine, with each subsequent iteration $f_j$ is getting closer to $f_i$ until they are close enough. However, in each iteration the gradient image of $f'_j$ has to be recalculated because $f'_j$ has been updated in step 2). The other issue is that $\delta P$ (and hence the Jacobian) depends on the depth measurements $z_j$, or, in the case of pre-surveying of depth in the stationary reference system, depends on the depth measurements z and the total image capturing device movement that leads to the frame $f_j$:$x_{cj}$, $R_j$.

In an embodiment of the present technology, wherein the depth measurements are obtained in the image capturing device-attached reference system (such as laser points, depth camera, stereo rig, etc), more depth measurements are available for frame $f_i$ because all previous frames measurements can be transformed to frame $f_i$'s reference system now that $x_{ci}$, $R_i$ is known.

In an embodiment of the present technology, whereas the depth of the scene is pre-surveyed in the stationary system, the total movement $x_{cj}$, $R_j$ is yet to be solved and thus can only be expressed as functions of $x_{ci}$, $R_i$ and $\xi$ when the form of Jacobian is calculated. This not only complicates the form of the Jacobian but also makes the Jacobian iteration-dependent.

In an embodiment of the present technology, the gradient image of $f_i$, and the Jacobian at frame $f_i$ are calculated while transforming $f_j$ in the iterations. Therefore 1) $d\xi$ is calculated using $\int |f_i(\delta P^{-1}(u)) - f_j(u)|^2 du$ instead in each iteration, which allows one to use the gradient image of $f_i$ and the Jacobian of reverse transformation $$\frac{\partial \delta P^{-1}(u)}{\partial \xi}$$

is evaluated at frame $f_i$, both of which need to be calculated only once. 2) The accumulated $\xi$, and $\delta P$, will be applied on $f_j$ to bring it close to $f_i$, so as to avoid any transformation on $f_i$.

So after redefining $$D = \nabla f_i \frac{\partial \delta P(u)}{\partial \xi}$$

which is evaluated at frame $f_i$, the image processing algorithm 25 is revised as follows:

1. Initialize $\xi$;
2. Initialize $$D = \nabla f_i \frac{\partial \delta P(u)}{\partial \xi}$$

at frame $f_i$;
3. Calculate $\delta P$ from $\xi$, perform transformation on $f_j$:

$$f_j(u) \Rightarrow f'_j(u) = f_j(\delta P(u));$$

4. Calculate $d\xi$ from $f_i$, $f'_j$, $$d\xi = \int (f_i(u) - f'_j(u)) D^T du / \int D D^T du;$$

5. Update $\xi$, $d\xi \Rightarrow \xi$;
6. If $d\xi$ is small enough or maximum iteration reached then exit, otherwise loop back to step 3.

The depth for each pixel in $f'_j$ is needed to compute $\delta P(u)$ in step 3). Since $f'_j$ is the best estimate of $f_i$ at the moment, the simplest choice is to use depth for pixels in $f_i$ instead.

In an embodiment of the present technology, the convergence of the iterations depends on how "smooth" the gradient image is. If the gradient image varies on a much smaller scale than the image displacement resulted from image capturing device movement between two frames, the loop may not converge. Therefore the two frames are smoothed first before being fed into the above loop. After an approximate $\xi$ is found from smoothed frames, the smoothing can be removed or reduced and a more accurate $\xi$ can be obtained with the previous $\xi$ as a starting point.

Thus, in an image iteration pyramid the higher level is more heavily smoothed while the bottom level is the raw image without smoothing. From top to bottom of the image pyramid $\xi$ is refined as follows:
1. Initialize $\xi$
2. Construct image pyramids of $f_i$ and $f_j$ if not already available
3. From top to bottom for each level of the pyramid
    3.1 initialize $$D = \nabla f_i \frac{\partial \delta P(u)}{\partial \xi}$$

at frame $f_i$;
    3.2 calculate $d\xi$ from $f_i$, $f'_j$, $$d\xi = \int (f_i(u) - f'_j(u)) D^T du / \int D D^T du;$$

3.3 update $\xi$, $d\xi \Rightarrow \xi$;
    3.4 perform transformation on $f_j$: $f_j(u) \Rightarrow f'_j(u) = f_j(\delta P(u))$;
    3.5 if $d\xi$ is small enough or maximum iteration reached then exit, otherwise loop back to step 3.2.

The explicit form of $\delta P(u_i)$ depends on the mapping function m. Even with a given m the form of $\delta P(u_i)$ is not unique. In an embodiment of the present technology when the lenses 16 comprises the rectilinear lenses and when pre-surveyed depth z is available, one may choose:

$$(\tilde{u}, \tilde{v}, \tilde{w}) = (u_i, 1)\left(1 - \frac{R_i^T(3,:)}{z - z_{ci}} \delta x_c\right) \delta R \quad \text{(Eqs. 14)}$$

$$\delta P(u_i) = \left(\frac{\tilde{u}}{\tilde{w}}, \frac{\tilde{v}}{\tilde{w}}\right),$$

where $R_i^T(3,:)$ is the transpose of the third row of the total rotation matrix $R_i$ at frame $f_i$. It is the unit vector in the z direction, expressed in frame $f_i$'s image capturing device-attached reference system.

$$D = \begin{pmatrix} -af_{i,u} \\ -af_{i,v} \\ a(uf_{i,u} + vf_{i,v}) \\ vf_{i,u} - uf_{i,v} \\ -(1+u^2)f_{i,u} - uvf_{i,v} \\ uvf_{i,u} + (1+v^2)f_{i,v} \end{pmatrix} \quad \text{(Eq. 15)}$$

$$a = (u, 1) \frac{R_i^T(3,:)}{z - z_{ci}}$$

In an embodiment of the present technology, when the depth measurements are made in the image capturing device-attached system ($z_i$ is known), one may choose $$(\tilde{u}, \tilde{v}, \tilde{w}) = \left((u_i, 1) - \frac{1}{z_i}\delta x_c\right)\delta R \quad \text{(Eqs. 16)}$$

$$\delta P(u_i) = \left(\frac{\tilde{u}}{\tilde{w}}, \frac{\tilde{v}}{\tilde{w}}\right)$$

and $$D = \begin{pmatrix} -af_{i,u} \\ -af_{i,v} \\ a(uf_{i,u} + vf_{i,v}) \\ vf_{i,u} - uf_{i,v} \\ -(1+u^2)f_{i,u} - uvf_{i,v} \\ uvf_{i,u} + (1+v^2)f_{i,v} \end{pmatrix} \quad \text{(Eq. 17)}$$

$$a = \frac{1}{z_i}$$

In an embodiment of the present technology, when the depth is known, one can match the depth of the two frames instead of pixel intensity because when the depth is known, the 3D coordinates of the pixel point are also known.

By treating the 3D coordinates in the image capturing device-attached system as a vector function of the 2D pixel coordinates:

$$(x_i(u_i) - \delta x_c)\delta R = x_j(u_j), \quad \text{(Eq. 18)}$$

one can use a cost function which is the square of the 3D distance between frame $f_i$ and frame $f_j$:

$$\int \|(x_i(u) - \delta x_c)\delta R - x_j(\delta P(u))\|^2 du. \quad \text{(Eq. 19)}$$

Another possibility would be to use the square of the difference of z component between these two.

This algorithm can be easily extended to handle color images. For example, for RGB images, frame $f=(f^r, f^g, f^b)$ is a row vector, and $D=(D^r, D^g, D^b)$ is a 6×3 matrix with $D^r$, $D^g$, $D^b$ each as a 6×1 column vector.

Similar to the algorithm optimization for pixel intensity, the Jacobian calculation is done on $x_i$ side, and the transformation is performed on $x_j$ side. The column vector D is now replaced by a 6×3 matrix D' because there are three components in a set of 3D coordinates:

$$D' = \nabla x_i \frac{\partial \delta P}{\partial \xi} - \left(\begin{pmatrix} -I_{3\times 3} \\ \begin{pmatrix} y_i & -x_i & 0 \\ -z_i & 0 & x_i \\ 0 & z_i & -y_i \end{pmatrix} \end{pmatrix}\right). \quad \text{(Eq. 20)}$$

In this embodiment of the present technology, the image processing algorithm 25 can be implemented by using the following loop routine:
 1. Initialize $\xi$
 2. Construct image pyramids of $z_i$ and $z_j$ if not already available
 3. From top to bottom for each level of the pyramid
  3.1 initialize D' at frame $f_i$
  3.2 calculate $\delta P$ from $\xi$, perform transformation on $x_j$:

$x_j(u) \Rightarrow x'_j(u) = x_j(\delta P(u))\delta R^T + \delta x_c$ 3.3 calculate $d\xi$ from $x_i$, $x'_j$, $d\xi = \int (x_i(u) - x'_j(u)) D'^T du / \int D'D'^T du$ 3.4 update $\xi$, $d\xi \Rightarrow \xi$
  3.5 if $d\xi$ is small enough or maximum iteration reached then exit, otherwise loop back to step 3.2.

In an embodiment of the present technology, one may use a combination of the pixel intensity matching cost function and the depth matching cost function $$\int (\lambda |f_i(u) - f_j(\delta P(u))|^2 + (1-\lambda)\|(x_i(u) - \delta x_c)\delta R - x_j(\delta P(u))\|)^2 du. \quad \text{(Eq. 21)}$$

$\lambda \in [0, 1]$ is a weighting factor to be adjusted according to how well the optical flow assumption is held, the quality of the optical image, and the quality of the depth image. The incremental change in each iteration is $$d\xi = \int \lambda (f_i(u) - f'_j(u)) D^T + (1-\lambda)(x_i(u) - x'_j(u)) D'^T du / \int \lambda DD^T + (1-\lambda) D'D'^T du \quad \text{(Eq. 22)}$$

In an embodiment of the present technology, the relation between the delta motion and the total motion of $f_i$ and $f_{i+1}$ is as follows:

$$R_{i+1} = R_i \delta R_{i \to i+1}$$

$$x_{ci+1} = x_{ci} + \delta x_{ci \to i+1} R_i^T. \quad \text{(Eqs. 23)}$$

If the loop exits on maximum iteration without converging on $\xi$ between $f_i$ and $f_{i+1}$, one may choose to replace $f_i$ with $f_{i-1}$, find out the movement between $f_{i-1}$ and $f_{i+1}$ instead, or one may choose to proceed between $f_i$ and $f_{i+2}$ and mark the result between $f_i$ and $f_{i+1}$ as unreliable.

The depth information for each pixel in $f_i$ is needed to 1) transform $f_j(u) \Rightarrow f'_j(u) = f_j(\delta P(u))$ and 2) to compute Jacobian at $f_i$. Depth information may arrive in different forms.

In an embodiment of the present technology, the scene is relatively flat and can be described by a few (much less than the pixel numbers in the frame) pre-surveyed points, in the stationary reference system. If this is the case, the pre-surveyed points expressed in the stationary reference system need to be transformed into the frame $f_i$'s reference system $z(x,y) \Rightarrow z_i(u_i)$. These points then will be used as the reference points to find out the depth for each pixel point in $f_i$ by triangular interpolation. In a triangular interpolation a point in the triangle is expressed as a combination of three vertices of the triangle. The three combination coefficients need to be adjusted when switching between the 3D reference system and projected 2D reference system, according to the depths of three vertices.

In an embodiment of the present technology, a few (much less than the pixel numbers in the frame) depth points are obtained along with each frame in image capturing device-attached system, such as from point lasers attached to the image capturing device, or matching feature points from a stereo camera rig.

If this is the case, the laser point depth measurements come with each frame. They and points from previous frames are put into three categories:

1) Settling points: laser point depth measurements come with frame $f_{i+1}$. They are used only if depth matching is employed.
2) Active points: laser point depth measurements come with frame $f_i$, and laser point depth measurements come with earlier frames which have not moved out of either frames and have been transformed into frame $f_i$'s reference system. These points are put in Delaunay Triangulation. The Delaunay vertex points are used as reference points to calculate pixel depth of by triangular interpolation.
3) Retired points: These points are from previous frame which have moved out of $f_i$ and $f_{i+1}$. These points are saved to form a depth map of the scene if desired.

In an embodiment of the present technology, a grid of depth points is available with each frame, in image capturing device-attached reference system, with the same resolution as or comparable resolution to the video frame.

In this case, depth measurements obtained with frame $f_i$ can be used directly if the resolution is the same, or can be interpolated if the resolution is lower. Depth measurements obtained with $f_i$ and $f_{i+1}$ can be used in depth matching directly or after interpolation.

Figure 2:
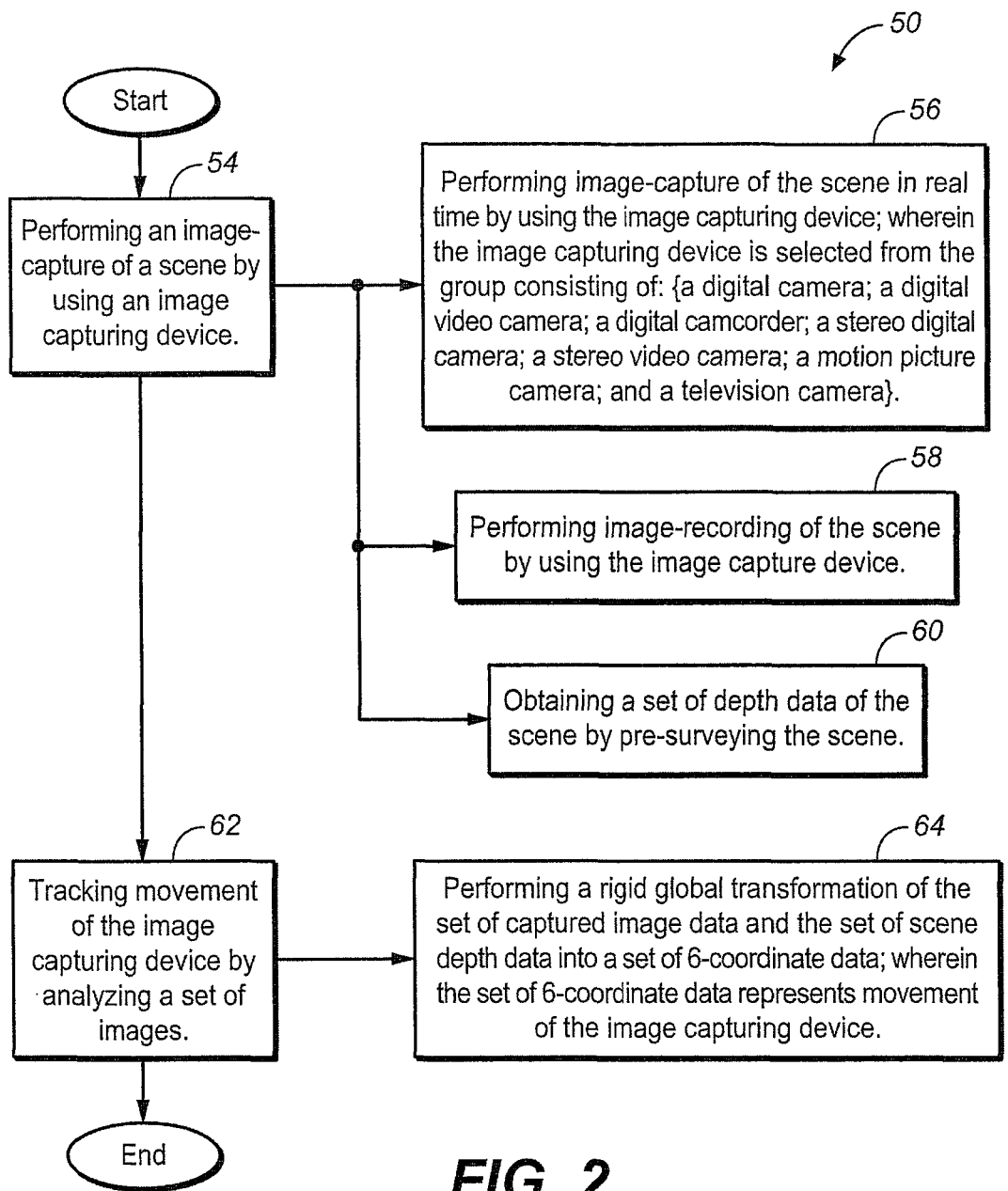
FIG. 2 is a flow chart of a method of image-tracking in accordance with an embodiment of the present technology, wherein the depth data of the scene is obtained by pre-surveying the scene.

In an embodiment of the present technology FIG. 2 is a flow chart 50 of a method of image-tracking by using the device 22 of FIG. 1, wherein the depth data of the scene 20 is obtained by pre-surveying the scene.

In this embodiment of the present technology, the method of image-tracking comprises two steps: (step 54) performing an image-capture of the scene 20 (of FIG. 1) by using an image capturing device; and (step 62) tracking movement of the image capturing device by analyzing a set of images obtained in the step 54.

In an embodiment of the present technology, step 54 of performing an image-capture of the scene 20 is performed in real time by using the image capturing device 22 (of FIG. 1)—step 56.

In an embodiment of the present technology, step 54 is performed by pre-recording the scene 20 by using the image capturing device 22—step 58.

In an embodiment of the present technology, step 54 further comprises obtaining a set of depth data of the scene 20 by pre-surveying the scene—step 60.

As was disclosed above, the image capturing device is selected from the group consisting of: {a digital camera; a digital video camera; a digital camcorder; a stereo digital camera; a stereo video camera; a motion picture camera; and a television camera}.

In an embodiment of the present technology, step 62 of tracking movement of the image capturing device by analyzing the set of images obtained in the step 54 further comprises the step 64 of performing a rigid global transformation of the set of captured image data and the set of scene depth data into a set of 6-coordinate data; wherein the set of 6-coordinate data represents movement of the image capturing device 22 (of FIG. 1).

Figure 3:
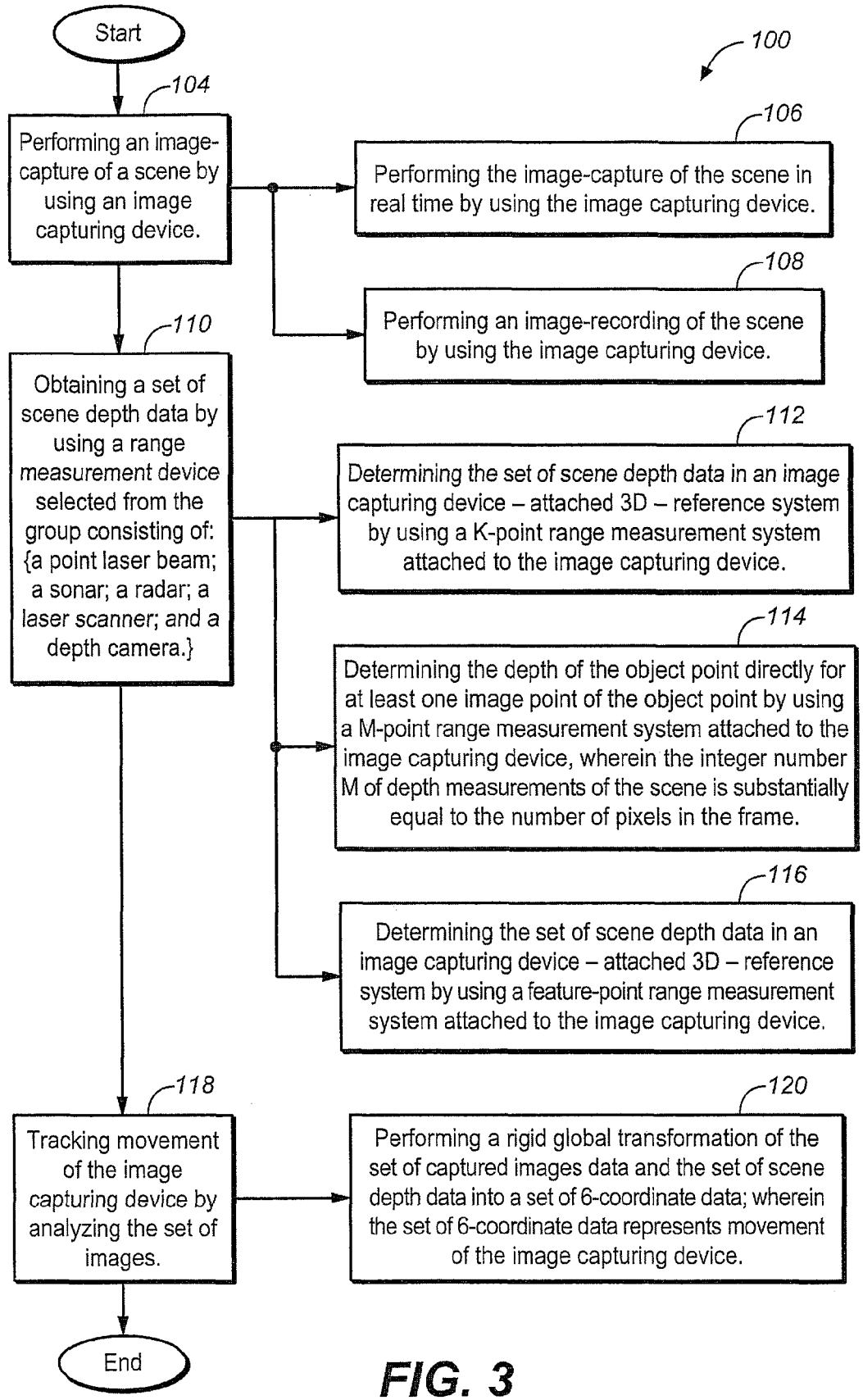
FIG. 3 illustrates a flow chart of a method of image-tracking in accordance with an embodiment of the present technology, wherein the depth data of the scene is obtained by using a range measurement device.
Figure 4:
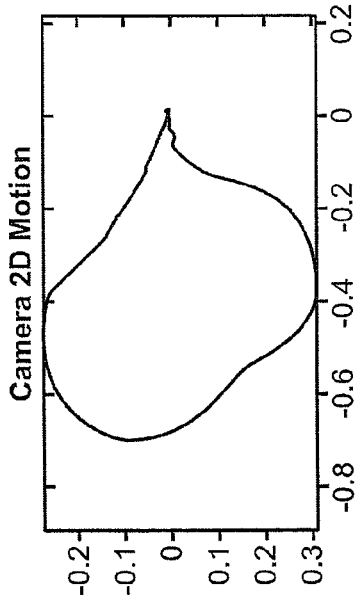
FIG. 4 is a diagram illustrates the taking by the image capturing device, an image of a scene.

In an embodiment of the present technology, FIG. 3 illustrates a flow chart 100 of a method of image-tracking, wherein the depth data of the scene is obtained by using a range measurement device 14.

In an embodiment of the present technology, the flow chart 100 of a method of image-tracking further comprises step 104 of performing an image-capture of a scene by using an image capturing device.

In an embodiment of the present technology, step 104 can be implemented by performing the image-capture of the scene in real time by using the image capturing device—step 106.

In an embodiment of the present technology, step 104 can be implemented by performing the step 108 of performing an image-recording of the scene by using the image capturing device.

In an embodiment of the present technology, the flow chart 100 of a method of image-tracking further comprises the step 110 of obtaining a set of scene depth data by using a range measurement device selected from the group consisting of: {a point laser beam; a sonar; a radar; a laser scanner; and a depth camera}.

In an embodiment of the present technology, the step 110 is implemented by determining the set of scene depth data in an image capturing device—attached 3D—reference system by using a K-point range measurement system attached to the image capturing device—step 112.

In an embodiment of the present technology, the step 110 is implemented by determining the depth of the object point directly for at least one image point of the object point by using an M-point range measurement system attached to the image capturing device, wherein the integer number M of depth measurements of the scene is substantially equal to the number of pixels in the frame—step 114.

In an embodiment of the present technology, the step 110 is implemented by determining the set of scene depth data in a image capturing device—attached 3D reference system by using a feature-point range measurement system attached to the image capturing device—step 116.

Finally, in an embodiment of the present technology, the flow chart 100 of a method of image-tracking further comprises the step 118 of tracking movement of the image capturing device by analyzing the set of images.

In an embodiment of the present technology, the step 118 is performed by performing a rigid global transformation of the set of captured images data and the set of scene depth data into a set of 6-coordinate data; wherein the set of 6-coordinate data represents movement of the image capturing device—step 120.

FIGS. 4, 5, 6, and 7 illustrate the sample results of the image-based tracking using the apparatus 22 of FIG. 1. More specifically, FIG. 2 depicts diagram 140 illustrating the image capturing device image of the scene 20 in the sensor plane 16.

Figure 5:
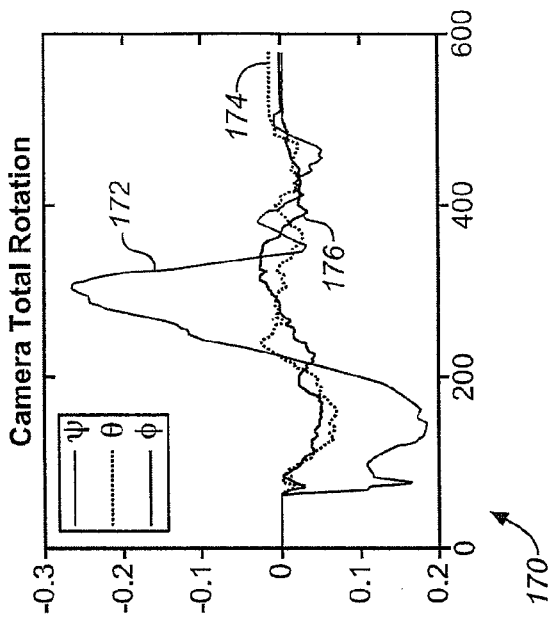
FIG. 5 depicts a diagram illustrating the image capturing device 2D motion calculated by using the image processing algorithm in accordance with an embodiment of the present technology.

FIG. 5 shows a diagram 150 illustrating the image capturing device 2D motion calculated by using the algorithm 25 of FIG. 1 as was fully disclosed above.

Figure 6:
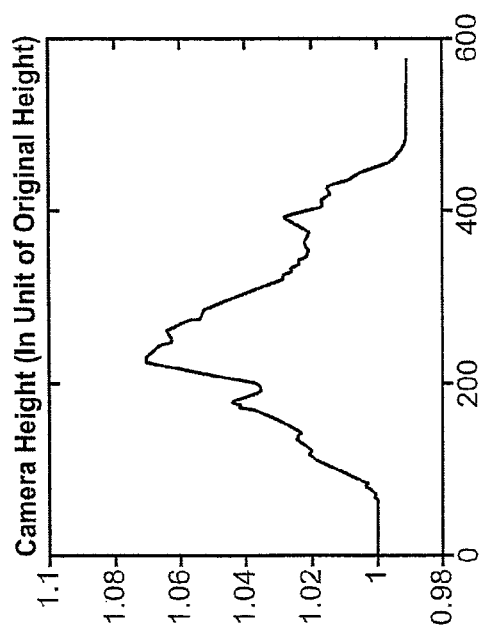
FIG. 6 is a diagram illustrating the image capturing device height motion calculated by using the image processing algorithm in accordance with an embodiment of the present technology.

FIG. 6 depicts a diagram 160 illustrating the image capturing device height motion calculated by using the algorithm 25 of FIG. 1 as was fully disclosed above.

Figure 7:
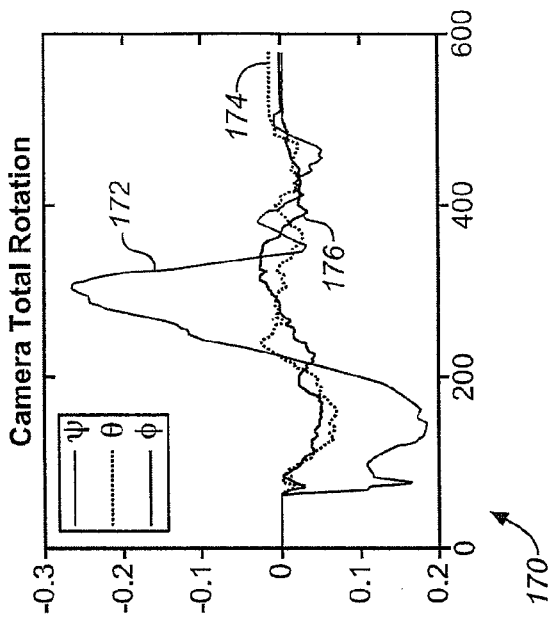
FIG. 7 depicts a diagram illustrating the image capturing device total rotation angels (yaw, pitch and roll) calculated by using the image processing algorithm in accordance with an embodiment of the present technology.

FIG. 7 shows a diagram 170 illustrating the image capturing device total rotation angels (yaw 172, pitch 174 and roll 176) calculated by using the algorithm 25 of FIG. 1 as was fully disclosed above.

In an embodiment of the present technology, whereas features are defined as not simply points, but also representation of regions and/or contours. In this embodiment of the present technology, broadly defined features can be used to substantially broaden the surface-tracking capabilities.

In an embodiment of the present technology, broadly defined-features can be used to use scene understanding techniques to discard problematic objects (i.e. cars).

In an embodiment of the present technology, the scene understanding techniques are methods that infer higher levels of reasoning from an image. For example, it can involve detecting the boundaries of cars, pedestrians in a scene and discarding matched features lying in those regions. Once such unwanted objects are identified; a usable region of the image is extracted. Feature matching is subsequently constrained to this region.

In an embodiment of the present technology, the detection of unwanted objects involves object recognition including: (A) extraction of sparse features from an image; (B) clustering neighboring features together; (C) and inferring an object category for at least one given cluster.

In an embodiment of the present technology, broadly defined-features can be used in the initial image analysis (such as contrast assessment) to determine suitability of image or image region for tracking.

In an embodiment of the present technology, if the quality of the images collected is too poor to be passed into surface tracking, e.g. the image is too dark, and very few features would be extracted and matched, an initial image assessment analysis is conducted to inform the operator in the field if the images are usable or if the images have to be re-collected.

In an embodiment of the present technology, an initial image assessment analysis comprises extracting of at least three attributes from the image: (A) saturation quality to check if an image consists mostly of one Red-Green-Blue value; (B) checking the texture quality of an image if the image is mostly blur and lacks sharp regions for feature extraction; (C) and checking an image contrast if the image is mostly dark or mostly bright, rendering the road surfaces substantially washed out.

In an embodiment of the present technology, broadly defined-features can be used to initialize the surface tracking solution.

In an embodiment of the present technology, more specifically, the initial solution can be found by using broadly defined-features and RANdom SAmple Consensus (RANSAC)

RANSAC is an iterative method to estimate parameters of a mathematical model from a set of observed data which contains outliers.

In statistics, an outlier is an observation that is numerically distant from the rest of the data. More specifically, an outlier is defined as an outlying observation that appears to deviate markedly from other members of the sample in which it occurs.

Outliers can occur by chance in any distribution, but they are often indicative either of measurement error or that the population has a heavy-tailed distribution. In the former case one wishes to discard them or use statistics that are robust to outliers, while in the latter case they indicate that the distribution has high kurtosis and that one should be very cautious in using tool or intuitions that assume a normal distribution. A frequent cause of outliers is a mixture of two distributions, which may be two distinct sub-populations, or may indicate 'correct trial' versus 'measurement error'; this is modeled by a mixture model.

In an embodiment of the present technology, the initial solution based on broadly defined-features and RANSAC is using a non-deterministic algorithm in the sense that it produces a reasonable result only with a certain probability, with this probability increasing as more iterations are allowed. The algorithm was first published by Fischler and Bolles in 1981.

In an embodiment of the present technology, whereas the initial solution using broadly defined-features and RANSAC is based on assumption that the data consists of "inliers", i.e., data whose distribution can be explained by some set of model parameters, and "outliers" which are data that do not fit the model. In addition to this, the data can be subject to noise. The outliers can come, e.g., from extreme values of the noise or from erroneous measurements or incorrect hypotheses about the interpretation of data. RANSAC also assumes that, given a (usually small) set of inliers, there exists a procedure which can estimate the parameters of a model that optimally explains or fits this data.

In an embodiment of the present technology, the method of using a set of broadly-defined-features to find an initial solution of the camera position as an input to surface tracking comprises the following steps: detecting a set of broadly defined features; establishing correspondences between set of broadly defined features and at least two selected frames; estimating homography between at least selected two frames using parameters of RANSAC mathematical model; deriving an initial pose of the image capturing device from the estimated homography between at least selected two frames; wherein the pose of the image-capturing device comprises position coordinates of the image-capturing device and a set of angular coordinates of the image-capturing device; and using the derived initial pose of the image capturing device as an initial solution to the surface tracking solution.

In an embodiment of the present technology, the method of using broadly-defined-features for finding a strict two-dimensional (strict_2D) surface tracking solution comprises: detecting a set of broadly defined features on a single tracking surface; selecting a set of coplanar broadly defined features by using parameters of RANSAC mathematical model; establishing correspondences between the set of selected coplanar broadly defined features and at least two selected frames; deriving an initial pose of the image capturing device from the homography between at least selected two frames; using the derived initial pose of the image capturing device as an initial solution to the strict two-dimensional (strict_2D) surface tracking solution; and grouping the set of coplanar features and using an area around the group of coplanar features as an input to the strict_2D surface tracking solution.

In an embodiment of the present technology, the method of using a set of coplanar broadly defined-features on a plurality of two-dimensional (2D) tracking surfaces for finding a substantially two-dimensional (sub_2D) surface tracking solution further comprises: detecting a set of broadly defined features on a plurality of tracking surfaces; selecting a set of coplanar broadly defined features by using parameters of the RANSAC mathematical model; establishing correspondences between the set of coplanar broadly defined features and at least two selected frames; deriving an initial pose of the image capturing device from the homography between at least two selected frames; using the derived initial pose of the image capturing device as an initial solution to a substantially two-dimensional (sub_2D) surface tracking solution; and selecting a local area around each selected coplanar broadly defined feature, grouping a plurality of the selected local areas into a two-dimensional (2D) global area and using the 2D global area as an input to the sub_2D surface tracking solution.

In an embodiment of the present technology, the method of using a set of broadly defined-features extracted from a three dimensional (3D) for finding a solution for a substantially three-dimensional (sub_3D) surface tracking further comprises: detecting a set of broadly defined features on the 3D surface; establishing correspondences between the set of broadly defined features and at least two selected frames; estimating homography between at least two selected frames; deriving an initial pose of the image capturing device from the homography between at least selected two frames; using the derived initial pose of the image capturing device as an initial solution to the substantially three-dimensional (sub_3D) surface tracking solution; and selecting a local area around each selected broadly defined feature, grouping a plurality of the selected local areas into a three-dimensional (3D) global area and using the 3D global area as an input to the sub_3D surface tracking solution.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method of image-based positioning comprising:
(A) performing an image-capture of a scene by using an image capturing device; wherein a set of captured images data and a set of scene depth data is created;
(B) performing a rigid global transformation of said set of captured images data and said set of scene depth data into a set of 6-coordinate data; wherein said set of 6-coordinate data represents movement of said image capturing device;
and
(C) determining the position coordinates of said image capturing device by using an image processing algorithm; said image processing algorithm including a global optical flow; said image processing algorithm including at least one step of parametrizing said global optical flow with said image capturing device.

2. The method of claim 1, wherein said step (A) further comprises:
(A1) performing said image-capture of said scene in real time by using said image capturing device; wherein said image capturing device is selected from the group consisting of: {a digital camera; a digital video camera; a digital camcorder; a stereo digital camera; a stereo video camera; a motion picture camera; and a television camera}.

3. The method of claim 1, wherein said step (A) further comprises:
(A2) performing image-recording of said scene by using said image capturing device.

4. The method of claim 1, wherein said step (A) further comprises:
(A3) obtaining a set of depth data of said scene by pre-surveying said scene.

5. The method of claim 4, wherein said step (A3) further comprises:
(A3, 1) obtaining said set of depth data of said scene by using a surveying instrument selected from the group consisting of: {a Global Navigation Satellite System (GNSS) surveying system; a laser plane system; and a theodolite}.

6. The method of claim 1, wherein said step (B) of performing said rigid global transformation of said set of captured images data and said set of scene depth data into said set of 6-coordinate data further comprises:
(B1) using a mapping function of said image capturing device to map for at least one i-th frame 3D coordinates of at least one object point in the reference system attached to said image capturing device, into 2D pixel coordinates of an image point on said image capturing device sensor plane in a 2D reference coordinate system; i being an integer.

7. The method of claim 6, wherein said step (B1) further comprises:
(B1, 1) selecting said mapping function of said image capturing device from the group consisting of: {a mapping function of regular rectilinear lenses; a mapping function of fisheye lenses; and a mapping function of custom-calibrated lenses}.

8. The method of claim 6, wherein said step (B1) further comprises:
(B1, 2) obtaining a reverse of said mapping function; wherein said reverse of said mapping function is configured to map, for at least one i-th frame, 2D pixel coordinates of at least one image point on said image capturing device sensor plane in a 2D reference coordinate system, into 3D coordinates of at least one object point in the reference system attached to said image capturing device.

9. The method of claim 6, wherein said step (B1) further comprises:
- (B1, 3) extracting a 6-vector describing said movement of said image capturing device from a relationship between two sequential frames: i-th frame and k-th frame, wherein at least one object point produces at least two pixels of substantially the same intensity in said two sequential frames.

10. The method of claim 9, wherein said step (B1, 3) further comprises:
- (B1, 3, 1) optimizing said 6-vector describing the movement of said image capturing device.

11. The method of claim 9, wherein said step (B1, 3) further comprises:
- (B1, 3, 2) optimizing said 6-vector describing the movement of said image capturing device by solving a non-linear least-squares problem for said relationship between said two sequential frames.

12. The method of claim 9, wherein said step (B1, 3) further comprises:
- (B1, 3, 3) optimizing a (6-n)-vector describing an n-dimensionally restricted movement of said image capturing device by optimizing said relationship between said two sequential frames; wherein integer n is less than 6.

13. The method of claim 6, wherein said step (B1) further comprises:
- (B1, 4) extracting a 6-vector describing said movement of said image capturing device from a relationship between said two sequential frames: i-th frame and k-th frame by matching the depth data for at least two pixels: a first said pixel and a second said pixel; wherein said first pixel is located in said i-th frame, and wherein said second pixel is located in said k-th frame.

14. The method of claim 6, wherein said step (B1) further comprises:
- (B1, 5) extracting a 6-vector describing said movement of said image capturing device from a relationship between two sequential frames: i-th frame and k-th frame by matching the depth data for at least two pixels: a first pixel and a second pixel; wherein said first pixel is located in said i-th frame, and wherein said second pixel is located in said k-th frame, and by matching at least two pixels having substantially the same intensity in said two sequential frames.

* * * * *